R. D. BROWN.
GLASS GATHERING MACHINE.
APPLICATION FILED MAR. 22, 1909.

960,264.

Patented June 7, 1910.
8 SHEETS—SHEET 1.

Fig. 1.

WITNESSES:

INVENTOR
ROSS D. BROWN,
BY
ATTORNEY

R. D. BROWN.
GLASS GATHERING MACHINE.
APPLICATION FILED MAR. 22, 1909.

960,264.

Patented June 7, 1910.
8 SHEETS—SHEET 2.

WITNESSES:
Ethel L. Lister
James H. Stone

INVENTOR
ROSS D. BROWN,
BY Thomas R. Ryan
ATTORNEY

R. D. BROWN.
GLASS GATHERING MACHINE.
APPLICATION FILED MAR. 22, 1909.

960,264.

Patented June 7, 1910.
8 SHEETS—SHEET 3.

WITNESSES:

INVENTOR
Ross D. Brown.
BY
ATTORNEY

R. D. BROWN.
GLASS GATHERING MACHINE.
APPLICATION FILED MAR. 22, 1909.

960,264.

Patented June 7, 1910.
8 SHEETS—SHEET 4.

WITNESSES:

INVENTOR
ROSS D. BROWN.
BY
Thomas L Ryan
ATTORNEY

R. D. BROWN.
GLASS GATHERING MACHINE.
APPLICATION FILED MAR. 22, 1909.

960,264.

Patented June 7, 1910.
8 SHEETS—SHEET 5.

Fig. 7.

WITNESSES:
Ethel L. Lister.
James H. Stone

INVENTOR
ROSS D. BROWN.
BY Thomas L. Ryan
ATTORNEY

R. D. BROWN.
GLASS GATHERING MACHINE.
APPLICATION FILED MAR. 22, 1909.

960,264.

Patented June 7, 1910.
8 SHEETS—SHEET 6.

WITNESSES:
Ethel L. Lister
James H. Stone

INVENTOR
ROSS D. BROWN.
BY
Thomas L. Ryan
ATTORNEY

UNITED STATES PATENT OFFICE.

ROSS D. BROWN, OF MUNCIE, INDIANA, ASSIGNOR OF ONE-HALF TO ROBERT H. RIFFE, OF MUNCIE, INDIANA.

GLASS-GATHERING MACHINE.

960,264. Specification of Letters Patent. Patented June 7, 1910.

Application filed March 22, 1909. Serial No. 484,917.

*To all whom it may concern:*

Be it known that I, ROSS D. BROWN, a citizen of the United States, and a resident of the city of Muncie, in the county of Delaware and State of Indiana, have invented new and useful Improvements in Glass-Gathering Machines, of which invention the following is a specification.

My present invention has reference to improvements in machines for gathering glass, and the objects of the invention are to provide a machine of the kind described which will be of improved construction over that shown in Letters Patent heretofore granted to me No. 838,768, dated December 18, 1906, and No. 904,402, dated November 17, 1908, and whereby increased efficiency and capacity and reliability of operation and performance may be obtained.

More specifically, the objects of my present invention are to provide such improved structure, combination and arrangement of parts, that the operation of the device will be positive, rapid and reliable, and may be easily controlled, and the machine may be worked at closer proximity to the tank.

Other objects are to provide improved means whereby the adaptation and adjustment of the machine to the working of glass of varying consistency may be easily accomplished.

The foregoing objects and further objects which will become apparent as the specification of my invention is disclosed, are accomplished by the new and novel construction, combination and arrangement of parts described in this specification, defined in the appended claims and illustrated in the accompanying drawings.

Corresponding parts are indicated by similar characters of reference appearing in the several views, in which—

Figure 9:
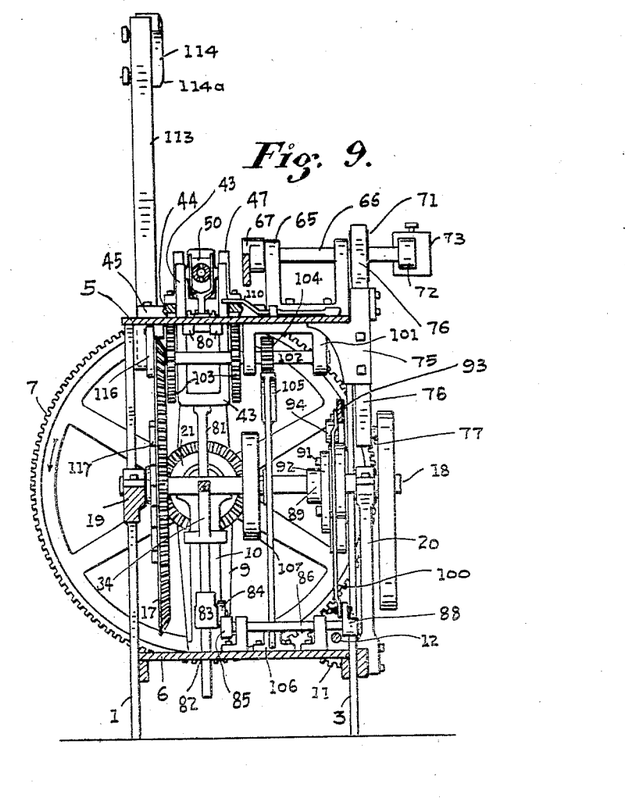
Fig. 9 is a vertical transverse sectional view taken on the line 9—9 Fig. 1.
Figure 10:
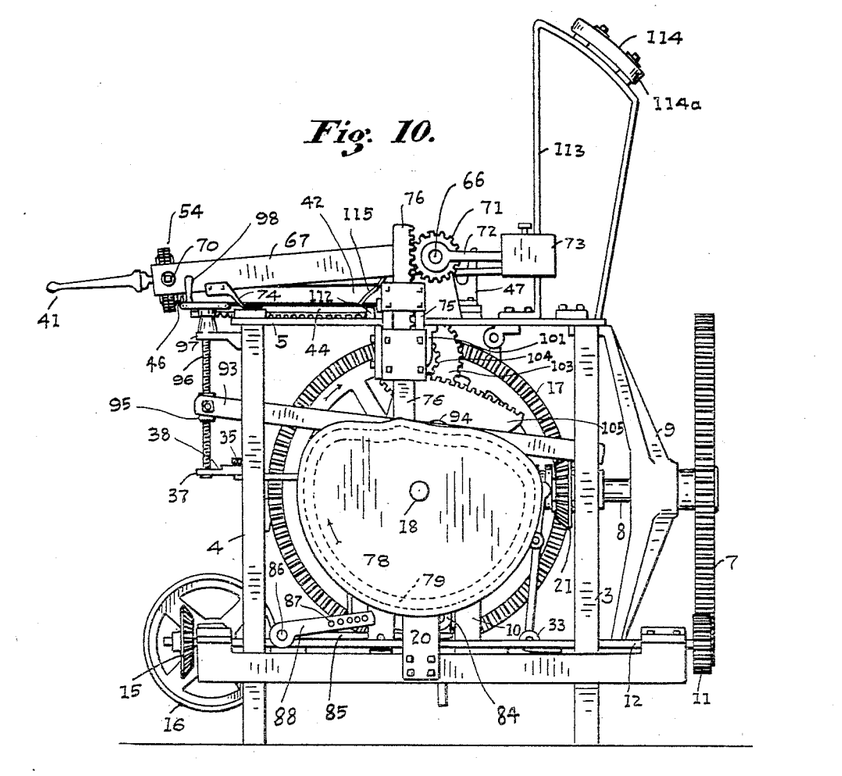
Fig. 10 is a rear view of the machine.

The suitable frame for my improved gathering machine as shown in the drawings, is composed of the uprights 1, 2, 3 and 4, upon which uprights are supported and connected by proper fastenings and braces the top plate 5 and the bottom plate 6. The gear wheel 7 is keyed to the shaft 8 that is journaled in the suitable boxing carried by the strut 9. The inner end of the shaft 8 is journaled in the standard 10. Motion is imparted to the gear wheel 7 through the pinion 11 which is keyed to the shaft 12. A desirable arrangement for the transmission of power to the shaft 12 is the shaft 13 suitably journaled on the frame and provided with the bevel gear wheel 14 adapted to mesh with the bevel gear wheel 15 carried by the shaft 12. Secured on the shaft 13 is the pulley 16 to which the driving power may be applied. The master gear wheel 17 is secured to the shaft 18 which is journaled in the strut 19 and in the standard 20, as plainly shown in Fig. 9.

Figure 11:
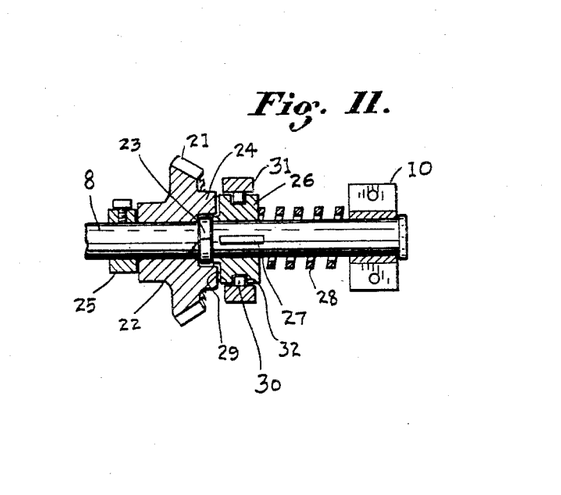
Fig. 11 is a detached enlarged sectional detail view of the clutch mechanism.

Motion to this master gear wheel is transmitted from the shaft 8, through the bevel gear wheel 21 that is mounted thereon. It is necessary that there may be means whereby this master gear wheel may be rendered operative or inoperative without stopping its movement. To accomplish this, and to afford a clutch mechanism between the shaft 8 and the bevel gear wheel 21 which will be effective and which will occupy small space and which will be economical of construction, the form, combination and arrangement of parts illustrated in Fig. 11 is provided. The bevel gear wheel 21 will be free to rotate on the shaft 8 but is held against longitudinal movement thereon. Projecting from the face of this bevel gear wheel are the studs 24 which will be engaged by the recesses 29 of the clutch-collar 26. This clutch collar is free to move longitudinally but is held against rotation on the shaft 8, by the feather 27. To afford a simple and very efficient construction whereby the bevel gear wheel 21 is held against longitudinal movement on the shaft 8, an annular groove 22 is provided in the shaft 8 at the proper location. This groove is then filled by a ring 23 of such thickness that when in position in the groove its circumferential portion will project. These half sections are placed in position in the said groove 22, and when the bevel gear wheel 22 is moved up against same, the internal edges of the lugs 24 will prevent its getting out of said groove. By the set collar 25, and said ring 23, the bevel gear wheel will be held against longitudinal movement on the said shaft.

By the strong coil spring 28 the ends of which bear against the clutch collar and the standard 10, the former is held normally in contact with the bevel gear wheel 21, the recesses 29 engaging the studs 24. The studs 30 of the fork 31 loosely engage the peripheral groove 32 of the clutch collar and the shank of the said fork is loosely secured to the block 33. The connecting bar 34 has its one end loosely connected to the shank of the fork 31, and the other end is loosely connected to the shift-bar 35. The fixed end of this shift bar is loosely connected to the upright 2 and its free end which has a suitable handle rests slidingly on the bracket 37 which is supported by the upright 4. The connecting bar 34 is of divided formation at its main portion whereby it may pass the standard 10 and adjacent parts. The coil spring 28 will keep the clutch collar normally in engagement with the bevel gear wheel 21 whereby the motion from the gear wheel 7 will be transmitted to the master gear wheel 17. To move the clutch collar out of such engagement the shift bar 35 is moved by the attendant at the handle and to sustain the clutch collar in such disengaged position the shift bar may be let down into the offset 38. By this arrangement just described, the master gear wheel 17 which drives the shaft 18 and all of the parts hereinafter described and which perform the essential functions of my invention, is easily rendered operative or inoperative.

Figures 12, 13:
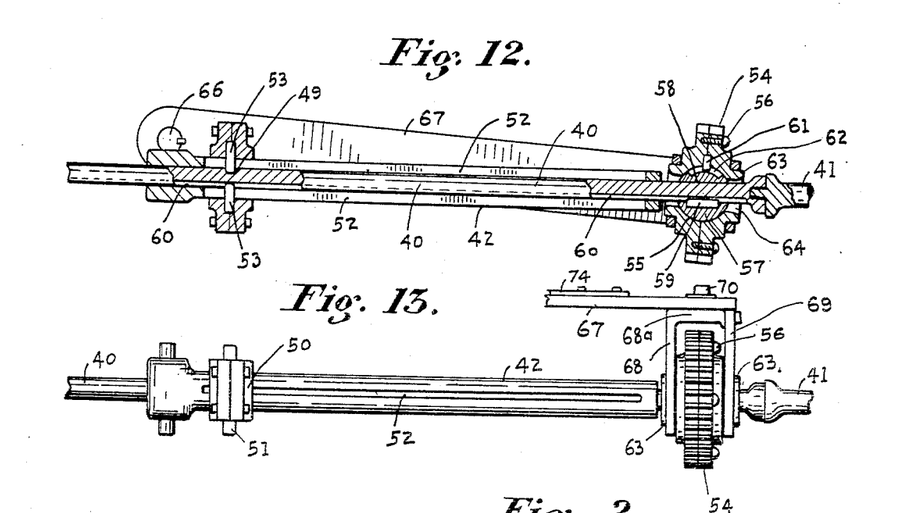
Fig. 12 is a detached enlarged detail sectional view and Fig. 13 is an enlarged plan view of the gathering instrument and punty rod gear.

The gathering instrument which comprises the punty rod 40, upon the end of which is carried the punty 41, and which gathering instrument will by my invention be manipulated in the manner hereinafter described, is supported slidingly in the machined sleeve 42. The inner end of this sleeve is disposed between and is supported pivotally on the oppositely disposed arms of the fork 43. The carrier frame which is disposed beneath the sleeve 42 consists of a pair of racks 44 oppositely disposed, their outer faces being angularly formed and which will move slidingly in the guide blocks 45. The teeth of these rack bars are on their undersides, as plainly shown in Fig. 4 and will mesh with the gearing hereinafter described. These rack bars are sustained properly apart at their outer ends by a countersunk cross plate and at their inner ends rest slidingly against the outer sides of the fork 43. The said cross plate terminates at its rearward corner in the form of a hook or lug 46, the function of which is to engage the member to be hereinafter described. Oppositely disposed on and secured on the inner ends of the rack bars are the lugs 47, each being provided with the mouth 48, the functions of which will be presently referred to. At a proper distance from the inner end of the punty rod 40 is provided the peripheral groove 49. The cross head 50 is centrally divided, its half sections being bolted securely together as shown in Fig. 12 and Fig. 13. It has proper bore to move slidingly on the smooth sleeve 42 and is provided with the transversely extended studs 51 which will slip into the mouths 48 of the lugs 47 when the sleeve has been moved to reverse position. Extending longitudinally of the sleeve, above and below, are the slots 52. The pins 53 are held securely between the half sections of the cross head 50 in the grooved recesses 50$^a$ therefor. These pins 53 are preferably rectangular in cross section and will reside loosely in the slots 52 and the ends thereof will engage loosely the peripheral groove 49. The transverse width of each of these pins is greater than the width of the longitudinal groove which is provided in the punty rod, as will be hereinafter referred to. By this construction the punty rod will be free to revolve and will be capable of positive longitudinal movement in the sleeve when the cross head 50 is moved.

Fastened to the outer end of the punty rod is the gear through which the desired rotary motion for the punty rod is transmitted. The construction, combination and arrangement of parts constituting this gear are shown in detail in Fig. 12, and form a material part of my invention and the utility thereof will be readily apparent as the operation of and functions performed by my invention are further and more completely understood. The gear wheel 54 is composed of complemental half sections each having the curvilinear bore 55 of such form that the said half sections when secured together by the suitable bolts 56 will loosely embrace the ball 57. This ball has the central perforation 58 whereby it is carried loosely on the punty rod. 59 designates a key that is rigidly secured in the perforation 58 and which key is free to move slidingly in the longitudinal groove 60 in the punty rod. This longitudinal groove extends the entire length of the punty rod so that its placement in the sleeve is easy. In assembling, the half sections of the cross head 50 are secured together after the pins 53 are placed in position with their interior ends inserted into the peripheral groove 49. Carried by the gear wheel 54 is the radially disposed pin 61 the inner end of which engages slidingly the groove 62 provided in the peripheral face of the ball. Each half section of this gear wheel has the boss 63, the bore 64 of which is of such diameter and bevel that the free movement of the gear wheel on the ball, regardless of its line of angularity with reference to the punty rod will not be interfered with.

Figure 1:
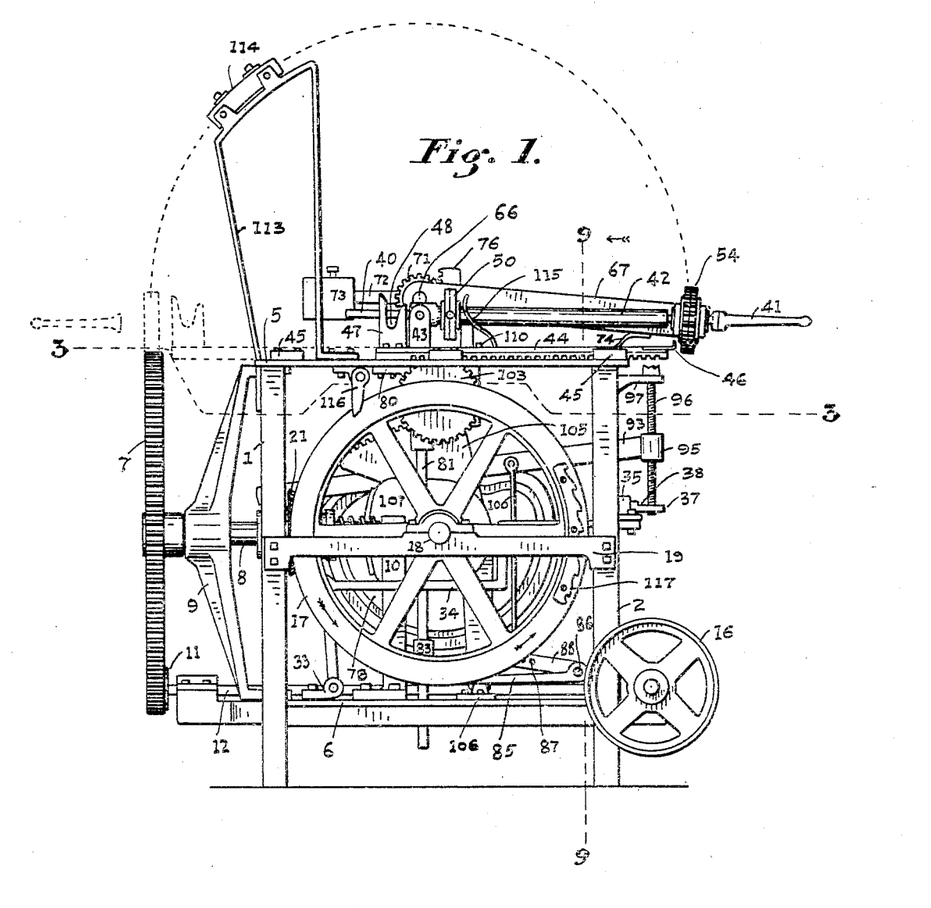
Figure 1 is a side view and Fig. 2 is a sectional plan view of my improved gathering machine.
Figure 15:
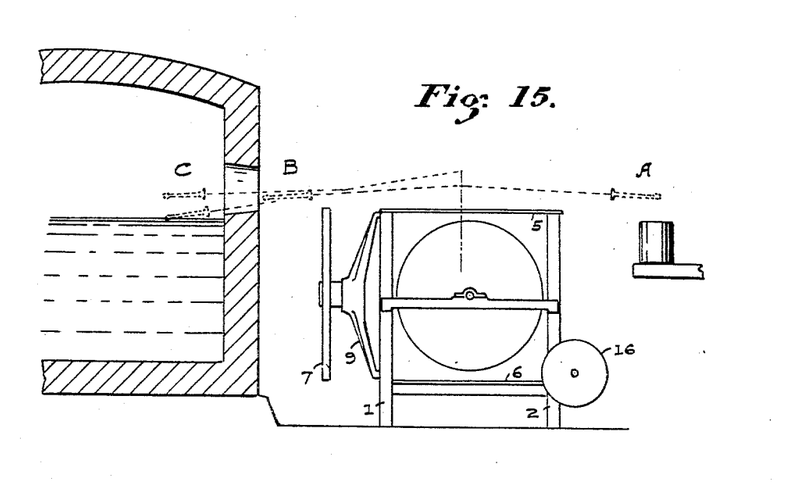
Fig. 15 is a diagrammatic view showing the relative positions of the tank and the mold, with reference to my improved gathering machine.

Mounted on the top plate 5 of the frame, are the standards 65, in which are journaled the shaft 66. Secured on the forward end of the shaft 66 is the arm 67 to the free end of which arm is fastened the yoke in which is rotatably carried the gear wheel 54. This yoke consists of the main plate 68 that has the leg 68ᵃ turned at an angle thereto, and which leg is secured to the free end of the said arm 67 by the suitable threaded stud or bolt 70. The outer plate 69 and the main plate 68 of this yoke are similarly bored for the retention loosely of the bosses 63. When the outer plate 69 is bolted to the leg 68ᵃ the gear wheel 54 will be free to rotate in the yoke thus formed. The function of the arm 67 is to carry the gathering instrument from the rearward or discharging station in which the same is shown in Fig. 1 and Fig. 15, to the forward station as shown by the dotted lines in Fig. 5.

Secured on the shaft 66 is the pinion 71, and on the rear end of the said shaft is secured the arm 72 upon which arm is carried the weight 73. This weight may be adjusted to different positions on the arm 72, whereby the weight of the arm 67 and the connected parts may be counterbalanced and steadiness of operation obtained. To afford a support for the free end of the arm 67 that will be of suitable resiliency so that there will not be undue impact or jar when the gathering instrument is delivered to the rearward station, the leaf spring 74 the free end of which will rest on the guide block 45 is carried on the underside of the said arm.

Adapted to mesh with the pinion 71 and slidingly supported on a suitable guide-way 75 that is properly fastened to the top plate 5 is the rack 76. The lower end of this rack is provided with the roller stud 77.

78 designates a cam wheel that is secured to the shaft 18 in such position that the stud 77 will work in the cam-grooves 79 therein.

Figure 7:
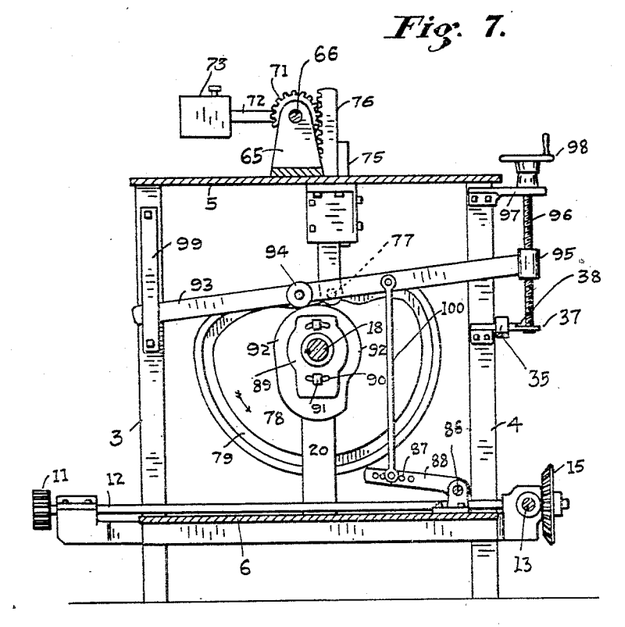
Fig. 7 is a vertical sectional view taken on the line 7—7 Fig. 3.
Figure 8:
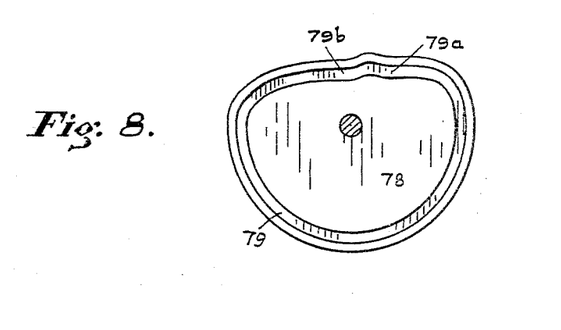
Fig. 8 is a detached view of the cam 78 as it appears in Fig. 7.
Figure 14:
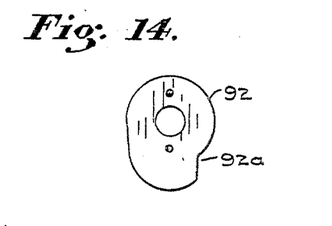
Fig. 14 is a detached view of the cam wheel 92.

Referring now to the fork 43. This fork is slidingly disposed in and sustained against lateral displacement by the guide blocks 80 secured on the underside of the top plate 5, and is mounted on the support rod 81 the lower end of which is passed through the aperture 82 therefor in the bottom plate 6 of the frame. Secured to the support rod is a block 83 which carries a roller stud 84. This stud rests on the lever 85 which is secured to the shaft 86 which is journaled in the suitable pillow blocks as shown. Secured on the rear end of the shaft 86 is the arm 88. Secured on the shaft 18 is a block 89 which has the slots 90. To this block is secured by the bolts 91 the cam wheel 92. A detached view of this cam wheel is seen in Fig. 14. The bar 93 is disposed above the cam wheel 92 in such position that the roller stud 94 carried by the said bar will rest on the said cam wheel, as shown in Fig. 7. The forward end of this bar is loosely secured to the block 95 which is capable of being raised or lowered by the screw 96 that is journaled in the brackets 37 and 97, and which screw may be manipulated by the hand wheel 98. The free end of the bar 93 is retained in correct alinement by the guide bar 99 that is fastened to the upright 3. Connecting the bar 93 to the arm 88 is the link 100. A succession of holes 87 are provided in the arm 88. The weight of the fork 43 and its connected parts which will rest on the lever 85 through the parts just described, namely the arm 88, the link 100 and the bar 93, will be carried on the peripheral face of the cam wheel 92. The normal height which it is desired for this fork to occupy may be obtained by adjusting the link 100 at the holes 87. More delicate adjustment of the height at which it may be desired for the cross head to work, is obtained by manipulation of the hand wheel 98 whereby the bar 93 may be raised or lowered.

Figures 4, 5, 6:
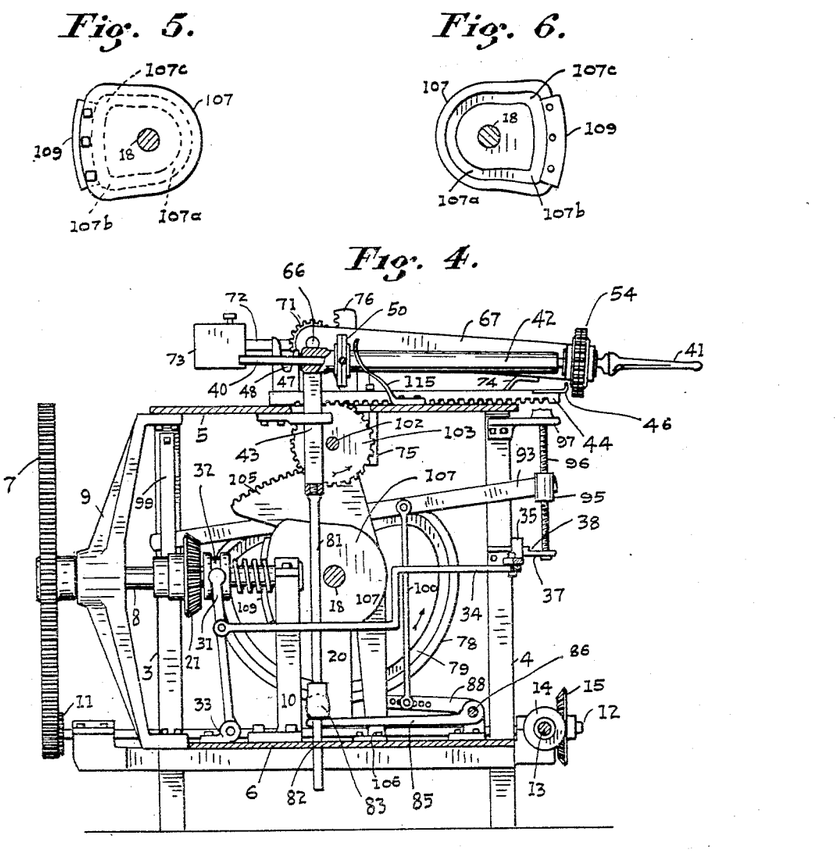
Fig. 4 is a vertical sectional view taken on the line 4—4 Fig. 3, the gathering mechanism being shown in central sectional elevation.
Fig. 5 is a detached view of the cam 107 as the same appears in Fig. 4.
Fig. 6 is a detached reverse view of the said cam.

The hanger 101 is of such structure as to afford a substantial support and bearing for the shaft 102. Secured on this shaft 102 are the twin gear wheels 103 which mesh with the racks 44 of the carrier frame. The small gear wheel 104 is of such size with reference to the twin gear wheels 103 and to the gear-sector 105 that with the movement of the gear sector its full length the carrier frame will be moved the entire distance of travel intended for it, as shown by the dotted line positions in Fig. 1 and in Fig. 15. It is very essential that the movement of the carrier frame shall be positive and reliable and the combination and arrangement of the respective parts whereby I accomplish such operation, I regard as important. The gear-sector is of the general form as shown in Fig. 4, the foot of the shank is journaled in the pillow block 106 which is secured to the bottom plate 6 of the frame. To obtain the correct actuation of the gear-sector is the function of the cam-wheel 107, as shown in Fig. 4 and in Fig. 5, and in the detached view in Fig. 6. Carried by the shank of the gear sector 105 is the roller stud 108 which will work in the cam-groove 107ª.

Figure 2:
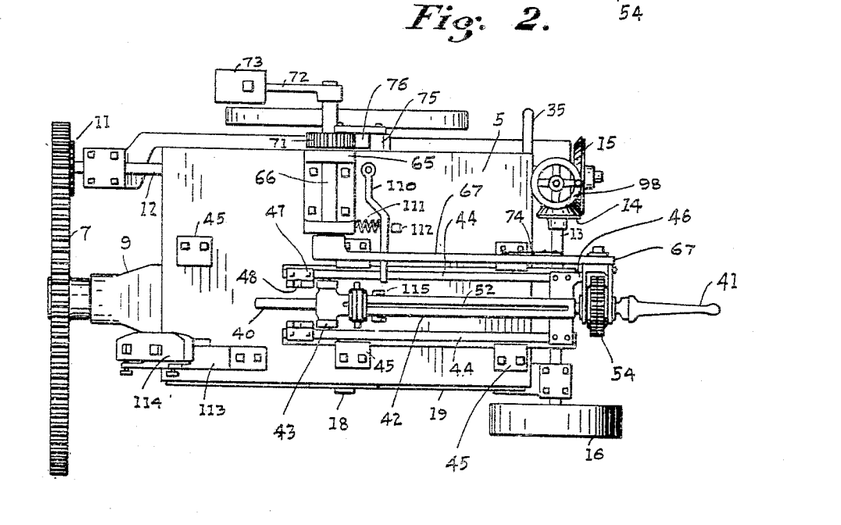
Figure 3:
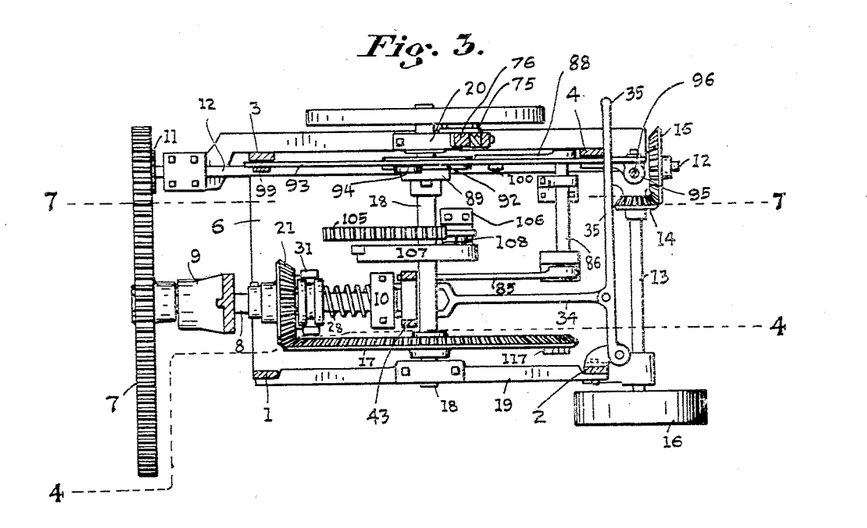
Fig. 3 is a plan view taken on the line 3—3 Fig. 1.

Reference will now be had to Fig. 2. The free end of the bar 110 which is pivotally secured to the top plate 5, lies on top of the carrier frame bar 44. The strong spring 111 holds this bar 110 toward the rearward position and the said said bar normally rests in contact with the stud 112 on the top plate.

For the reasons which will be presently referred to, it is necessary that the gathering instrument, and which is projected and retracted by the carrier frame, should be moved away from the tank, at a speed different from that of the movement of the same into the tank.

The cam wheel 107 has the peculiarly formed cam-groove 107ª, and the said cam wheel is capable of the reception of the cam block 109. When the carrier frame approaches the forward position the bar 110 is engaged by the cross plate 46 and by the tension of the spring 111 the roller stud 108 which works in the groove 107ª will be held against the outer wall of the said groove. The speed and action of the carrier frame may be varied according to the formation of the cam block 109. Supported by the frame 113 and held in position to be engaged by the gear wheel 54, on its line of travel when being oscillated from the forward to rearward position, is the block 114. This block is adjustably held in position and its face is composed of leather the ends 114ª thereof being beveled so that the gear wheel 54 in passing, will engage said block positively; a smart impulse will be given to the gear wheel 54, whereby the drip end of the soft gather that is carried by the punty, will be so disposed that when the punty reaches the rearward station, the glass will drip directly over the point of delivery. Coincident with the arrival of the gathering mechanism at the rearward station, as shown in Fig. 1, the spring fork 115 which has its base secured to the top 5 will engage the cross head 50 and overcome any tendency of the gathering instrument to move longitudinally.

My improved glass gathering machine in readiness for operation appears as shown in Fig. 1, and by reference to Fig. 15 the position of the machine with reference to the tank and the mold, will be clearly understood. By the power from any suitable source applied to the pulley 16, the gear wheel 7 will be rotated. The directions of the movement of the several parts of the machine are indicated by the arrows. With the movement of the shift-bar 35 the clutch collar 26 is moved into engagement with the bevel gear wheel 21 which operates the master gear wheel 17. As the portion 79ª of the cam-groove of the cam wheel 78 passes the stud 77, the rack 76 is raised and with the rotary movement of the pinion 71 the arm 67 is oscillated forwardly. The gathering instrument is swung from the rearward position A into the forward dotted line position B as shown in Fig. 1 and in Fig. 15. Although this operation is done quickly its movement which is controlled by the cam 79 is such that as the gear-wheel 54 reaches the dotted line position B it will be laid into mesh with the gear wheel 7 with nicety and precision. By virtue of the new construction, arrangement and combination of the gear wheel 54 with the punty rod, as illustrated in Figs. 12 and 13, the adjustment of the gear wheel 54 with reference to the punty rod will at all times be correct, and the rotation of the punty will be positive and constant as long as the gear wheel 54 is in mesh with the gear wheel 7. Coincident with the oscillation of the gathering instrument to the said position B, the portion 107ᵇ of the cam-groove on the cam wheel 107 causes a movement of the gear-sector 105 whereby the carrier frame is moved forwardly. The cross head 50 being in engagement with the lugs 47 the gathering instrument will by the movement of the carrier frame be projected so that the punty will occupy the dotted line position C shown in Fig. 15, the punty being then disposed immediately above the molten glass. The portion 92ª of the cam wheel 92 lifts the lever 85 which by raising the fork 43 that carries the rear portion of the gathering instrument, the punty 41, revolving, is lowered into the glass.

On account of the fact that the consistency of the glass that is being worked may vary from time to time, it is necessary that the raising and lowering and the withdrawing of this gathering instrument may be positively controlled, and may be capable of correct adjustment, so that the gathering operation may be uniform and reliable.

When the link 100 and the hand wheel 98 are properly adjusted, the operation of the punty will be such that as the punty is being raised, the proper charge or quota of glass will be gathered. If the batch which is being worked is "stiff" it is necessary that the punty should have imparted to it a twitch or sudden rearward movement in order that the moil of the quota gathered shall be urged toward the end of the punty. This is accomplished by the cam block 109, which causes the carrier frame to momentarily move rearwardly, just as the punty has wrapped on to itself the gather. The exact pre-determined time for this twitch with reference to the relative position of the punty to the molten supply may be regulated by the adjustment on the block of the cam wheel 92. As the fork 43 is lowered the punty will be returned to the position C, then the carrier frame is moved rearwardly and the gathering instrument is withdrawn from the tank and immediately upon its reaching the position B, the rack 76 is again actuated and by the oscillation of the arm 67, the punty is brought to the discharging station A.

The speed of movement of the gathering instrument from position C to B, and from B to A, is so controlled by the portions $107^c$ and $79^b$ of the cam grooves $107^a$ and 79 respectively and the impulse given to the punty as it passes the block 114 is such that when the gathering instrument is delivered to the position A and to rest on the spring 74, the glass will drip from the punty with uniform precision. The moving parts are so timed that the gathering instrument will remain at position A momentarily and thence the performance of the machine is a repetition of the operations described.

To prevent possible backward movement of the gathering mechanism when the same is at the tank, and when the clutch mechanism may have been operated to stop the movement of the machine, the pawl 116 is provided at a proper position to engage the curved toothed sector 117 carried by the master wheel 17.

It is understood that minor changes might be made in the construction and arrangement of the several parts and details, within the scope of my invention as defined by the appended claims, without departing from the spirit thereof or sacrificing any of its advantages.

What I claim as my invention and desire to secure by Letters Patent of the United States, is—

1. In a glass gathering machine, the combination with a gathering device including a sleeve pivotally mounted and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on which the said pinion is journaled, a carrier member adapted to be engaged by the said cross head when the sleeve is oscillated to forward position, means to oscillate the said arm and to move the carrier member whereby the gathering device is moved toward the tank and the gathering instrument is then projected into and retracted from the tank and the gathering device is then returned to rearward position, and a gearing to rotate the gathering instrument while same is at the tank.

2. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, driving means to oscillate the said arm and to move the carrier member whereby the gathering device is moved toward the tank, and the gathering instrument is then projected into and retracted from the tank and the gathering device is then returned to rearward position, a gearing to rotate the gathering instrument while same is at the tank, devices to render the aforesaid driving means inoperative while the gathering instrument is at the tank and without stopping the rotary movement of the gathering instrument.

3. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, means to oscillate the said arm and to move the carrier member whereby the gathering device is moved toward the tank, and the gathering instrument is then projected into and retracted from the tank and the gathering device is then returned to rearward position, means to rotate the gathering instrument while same is at the tank, a driving mechanism for operating both of the aforesaid means, a slidable spring-operated clutch whereby the means that operates the oscillatory arm may be thrown out of operation without stopping the movement of the driving mechanism.

4. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, driving means to oscillate the said arm and to move the carrier member whereby the gathering device is moved toward the tank, and the gathering instrument is then projected into and retracted from the tank and the gathering device is then returned to rearward position, means to rotate the gathering instrument while same is at the tank, devices to render the said driving means inoperative while the gathering instrument is at the tank and without stopping the rotary movement of the gathering instrument, means for locking the gathering device against oscillation when the rotary movement of the gathering instrument is stopped.

5. In a glass gathering machine, the combination with a gathering device including a sleeve, and a gathering instrument free to move slidingly and rotatively therein, of a vertically movable fork in which one end of said sleeve is pivotally mounted, a cross head slidingly mounted on said sleeve and which engages the gathering instrument, a pinion loosely secured on the gathering instrument and in which pinion the said gathering instrument is free to move longitudinally but not rotatively, an oscillatory arm to the free end of which the said pinion is journaled, a carrier member adapted to be engaged by the said cross head when the gathering instrument has been oscillated to the forward position, driving means to actuate the said arm, carrier member and vertical fork, whereby the gathering mechanism is moved toward the tank, and the gathering instrument is then projected into and retracted from the tank, and the gathering instrument is then returned to rearward position, means to rotate the gathering instrument while same is at the tank, devices to render the said driving means inoperative while the gathering instrument is at the tank without stopping the rotary movement of the gathering instrument.

6. In a glass gathering machine, the combination with a gathering device including a sleeve and a gathering instrument free to move slidingly and rotatively therein, of a vertically movable fork in which one end of the said sleeve is pivotally mounted, a cross head slidingly mounted on said sleeve and which engages the gathering instrument, a pinion loosely secured on the gathering instrument and in which pinion the said gathering instrument is free to move longitudinally but not rotatively, a stationary support, a short transverse shaft journaled in standards secured to said support, an oscillatory arm secured on said shaft, at the free end of which oscillatory arm is journaled the said pinion, a pinion secured on the other end of said short transverse shaft, a rack mounted on said stationary support and adapted to mesh with the said last named pinion, a carrier frame mounted on the said stationary support and adapted to be reciprocated thereon, said carrier frame having lugs thereon to be engaged by the cross head when the gathering device is oscillated to the forward position, a main transverse shaft journaled below the carrier frame, a master gear wheel carried thereon, power transmitting connections between the main transverse shaft and the said carrier frame and the said rack and the said vertically movable fork to operate the same substantially as and for the purposes described, a longitudinal shaft journaled adjacent the main transverse shaft, a large gear wheel carried by the former and adapted to mesh with the pinion carried by the gathering instrument when it has been oscillated to the forward position, a loose pinion carried by the longitudinal shaft and adapted to mesh with the master gear wheel, a slidable clutch carried on said longitudinal shaft, a spring to maintain the said pinion normally in operative engagement with the longitudinal shaft, means to render said clutch inoperative.

7. In a glass gathering machine, the combination of a gathering device including a sleeve and a gathering instrument free to move slidingly and rotatively therein, of a vertically movable fork in which one end of said sleeve is pivotally mounted, a cross head slidingly mounted on said sleeve and which engages the gathering instrument, a pinion loosely secured on the gathering instrument and in which pinion the said gathering instrument is free to move longitudinally but not rotatively, a stationary support, a short transverse shaft journaled in standards secured to said support, an oscillatory arm secured on said shaft at the free end of which oscillatory arm is journaled the said pinion, a pinion secured on the other end of said short transverse shaft, a rack mounted on said stationary support and adapted to mesh with the said last named pinion, a carrier frame slidably mounted on said stationary support, comprising a pair of racks sustained apart and disposed beneath the gathering device and having lugs thereon to be engaged by the cross head when the gathering device is oscillated to the forward position, a main transverse shaft journaled below the carrier frame, a second short transverse shaft journaled in hangers secured to the stationary support, twin gear wheels secured by said second short transverse shaft and adapted to mesh with the racks of the carrier frame, a pinion secured to the second short transverse shaft, a gear-sector that is adapted to mesh with the pinion carried by the second short transverse shaft and having its foot pivotally secured to the stationary support, a cam wheel secured to the main transverse shaft to reciprocate said gear sector, a second cam to reciprocate the said rack that meshes with the pinion of the short transverse shaft, and a third cam carried by said main transverse shaft, connections between the third cam and the vertically movable fork whereby the latter will be raised and lowered, said parts being all combined and arranged substantially as and for the purposes described.

8. In a glass gathering machine, a gathering device comprising a sleeve provided with a longitudinal slot therein, a gathering instrument provided with a longitudinal groove, and near its rear end with an annular transverse groove, a cross head slidably mounted on the said sleeve and having radially disposed pins secured therein and adapted to engage slidingly the longitudinal slots of the sleeve and the annular groove in the gathering instrument there being transversely extended studs on the said cross head, a pinion loosely secured to the gathering instrument and in which pinion the said gathering instrument is free to move longitudinally but not rotatively, a vertically movable fork in which the end of the sleeve is pivotally mounted, an oscillatory arm, having a U shaped yoke arranged transversely to and secured on the free end of the arm and adapted to retain rotatively the said pinion, a reciprocatory carrier member having lugs thereon adapted to be engaged by the studs of the cross head.

9. In a glass gathering mechanism, the combination of a sleeve provided with a longitudinal slot therein, a gathering instrument slidingly disposed in said sleeve and provided with a longitudinal groove and near its rear end with an annular transverse groove, a ball having a central bore and which is slidingly disposed on the said gathering instrument there being a key secured in the bore of said ball and adapted to occupy slidingly the longitudinal groove in the gathering instrument, there being a peripheral groove in the said ball, a pinion composed of separable half sections adapted to be secured together by bolts each half section being internally machined so as to embrace the ball loosely the external openings of the recess in which said ball is held being of a diameter greater than that of the gathering instrument, an internally disposed pin carried by the pinion that is adapted to engage the peripheral groove in the ball, lateral bosses provided on the pinion, a yoke in which said pinion is journaled, said yoke being adapted to have connections with an oscillatory member, means to move the cross head.

10. In a glass gathering machine, the combination of a vertically movable member, a glass gathering device having its one end pivotally supported thereon, an extensible gathering instrument, a stationary support, a carrier thereon adapted to be engaged by the said gathering instrument when the latter is disposed at the forward position, cam actuated means to reciprocate said carrier, a cam to operate said means, a lever to engage the said vertically movable member, a second cam, a bar having its one end adapted to be sustained in different adjusted positions the free end of said bar having connections with said second cam, so as to be raised and lowered thereby, adjustable connections between the said bar and said lever, means to adjust the position of the second cam with reference to the first named cam, to control the vertical movement of the pivoted end of the gathering mechanism with reference to the reciprocatory movement of the glass gathering instrument by the carrier.

11. In a glass gathering machine, the combination of a vertically movable member, a glass gathering device having its one end pivotally supported therein, an extensible gathering instrument, a stationary support, a carrier thereon adapted to be engaged by the said gathering instrument when same is disposed at its forward position, gearing to actuate the said carrier, a reciprocatory gear sector to engage said gearing, means to control the movement of said gear sector embodying a side face cam the cam-groove thereof to engage a stud carried by the sector gear, a spring to engage the carrier when at the end of its forward movement to hold the gear sector stud against the outer wall of the cam groove, said cam being capable of having connected thereto means to vary the movement of the gear sector while the carrier is at the above named forward position, a lever to engage said vertically movable member, a second cam, a bar having its one end adapted to be sustained at different adjusted vertical positions the free end of said bar having connections with said second cam so as to be raised and lowered thereby, adjustable connections between said bar and the said lever, means to adjust the position of the second cam with reference to that of the first named cam, to control the time of the movement of the vertically movable member, with reference to the time of the movement by the first named cam, of the carrier.

12. In a glass gathering machine, the combination with a gathering device including a sleeve and a gathering instrument free to move slidingly and rotatively therein, of a vertically movable fork in which one end of the said sleeve is pivotally mounted, a cross head slidingly mounted on said sleeve and which engages the gathering instrument, a pinion loosely secured on the gathering instrument and in which pinion the said gathering instrument is free to move longitudinally but not rotatively, a stationary support, a short transverse shaft journaled in standards secured to said support, an oscillatory arm secured on said shaft, at the free end of which oscillatory arm is journaled the said pinion, a pinion secured on the other end of said short transverse shaft, a rack mounted on said stationary support and adapted to mesh with the said last named pinion, a carrier frame mounted on the said stationary support and adapted to be reciprocated thereon, said carrier frame having lugs thereon to be engaged by the cross head when the gathering device is oscillated to the forward position, a block mounted above the stationary support in position to be engaged by the pinion of the gathering instrument in the course of the travel of the latter to the rearward position, a main transverse shaft journaled below the carrier frame, a master gear wheel carried thereon, power transmitting connections between the main transverse shaft and the said carrier frame and the said rack and the said vertically movable fork to operate the same substantially as and for the purposes described, a longitudinal shaft journaled adjacent the main transverse shaft, a large gear wheel carried by the former and adapted to mesh with the pinion carried by the gathering instrument when it has been oscillated to the forward position, a loose pinion carried by the longitudinal shaft and adapted to mesh with the master gear wheel, a slidable clutch carried on said longitudinal shaft, a spring to maintain the said pinion normally in operative engagement with the longitudinal shaft, means to render said clutch inoperative.

13. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, means to oscillate the said arm and to move the carrier member whereby the gathering device is moved toward the tank and the gathering instrument is then projected into and retracted from the tank and the gathering device is then returned to rearward position, a device to hold the gathering instrument against longitudinal movement in the sleeve when at the said rearward position, and a gearing to rotate the gathering instrument while same is at the tank.

14. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, means to oscillate the said arm and to move the carrier member whereby the gathering device is moved toward the tank and the gathering instrument is then projected into and retracted from the tank and the gathering device is then returned to rearward position, a member disposed adjacent the gathering device to be engaged by the pinion of the gathering instrument in the course of the travel of the latter in its oscillatory movement, and a gearing to rotate the gathering instrument while same is at the tank.

15. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, means to oscillate the said arm and to move the carrier member whereby the gathering device is moved toward the tank and the gathering instrument is then projected into and retracted from the tank and the gathering device is then returned to rearward position, means to impart to the gathering instrument a sudden longitudinal movement thereof while same is at the position projected into the tank, and a gearing to rotate the gathering instrument while same is at the tank.

16. In a glass gathering machine, the combination with a gathering device including a sleeve pivotally mounted at one end and a gathering instrument free to move slidingly and rotatively therein, of a cross head slidingly mounted on the said sleeve and which engages the gathering instrument, a pinion loosely secured on the gathering instrument and in which pinion the said gathering instrument is free to move longitudinally but not rotatively, an oscillatory arm on the free end of which the said pinion is journaled, a carrier member adapted to be engaged by the said cross head when the sleeve is oscillated to forward position, means to oscillate the said arm and to move the carrier member whereby the gathering device is moved toward the tank and the gathering instrument is then projected into and retracted from the tank and the gathering device is then returned to rearward position, means to move vertically the rearward end of the gathering instrument while same is at the position projected into the tank, means to impart to the gathering instrument a sudden longitudinal movement thereof while same is at the position projected into the tank, and a gearing to rotate the gathering instrument while same is at the tank.

In testimony whereof I sign my name to this specification in the presence of two subscribing witnesses.

ROSS D. BROWN.

Witnesses:
ROBERT H. RIFFE,
THOMAS L. RYAN.